United States Patent [19]
Blackburn et al.

[11] 3,791,212
[45] Feb. 12, 1974

[54] FLUID METERING APPARATUS

[76] Inventors: Wayne A. Blackburn, 240 Oregon Ave.; Sevall W. Hemness, 313 GW Ave., both of Lovell, Wyo. 82431

[22] Filed: Jan. 7, 1972

[21] Appl. No.: 216,059

[52] U.S. Cl. .................................. 73/251, 222/249
[51] Int. Cl. ............................................ G01f 3/16
[58] Field of Search. 73/250, 251; 222/38, 249, 250

[56] References Cited
UNITED STATES PATENTS

| 159,143 | 1/1875 | Baker | 73/251 |
| 1,901,178 | 3/1933 | Malm | 73/251 |
| 252,900 | 1/1882 | Rensink | 73/251 |
| 529,156 | 11/1894 | Beck | 73/251 |

FOREIGN PATENTS OR APPLICATIONS

| 507,800 | 9/1920 | France | 73/251 |

*Primary Examiner*—Robert B. Reeves
*Assistant Examiner*—Thomas E. Kocovsky
*Attorney, Agent, or Firm*—Clarence A. O'Brien; Harvey B. Jacobson

[57] ABSTRACT

A fluid metering apparatus for dispensing additives into petroleum products or the like, said apparatus comprising a cylinder with fluid handling ports at opposite ends, a piston reciprocally mounted in the cylinder, a counter operatively connected to the piston to record the number of piston strokes indicative of the volume of fluid dispensed, a plurality of on-off valves controlling the flow of fluid through the cylinder, and a snap-action over-center mechanism interconnecting the piston with the valves by way of adjustable couplings to assure simultaneous actuation of the valves.

8 Claims, 7 Drawing Figures

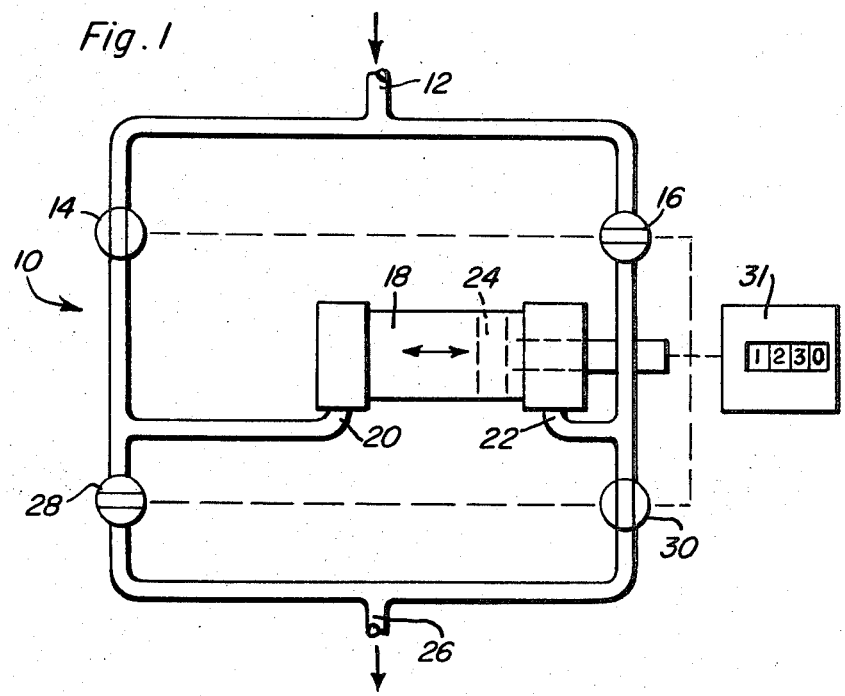
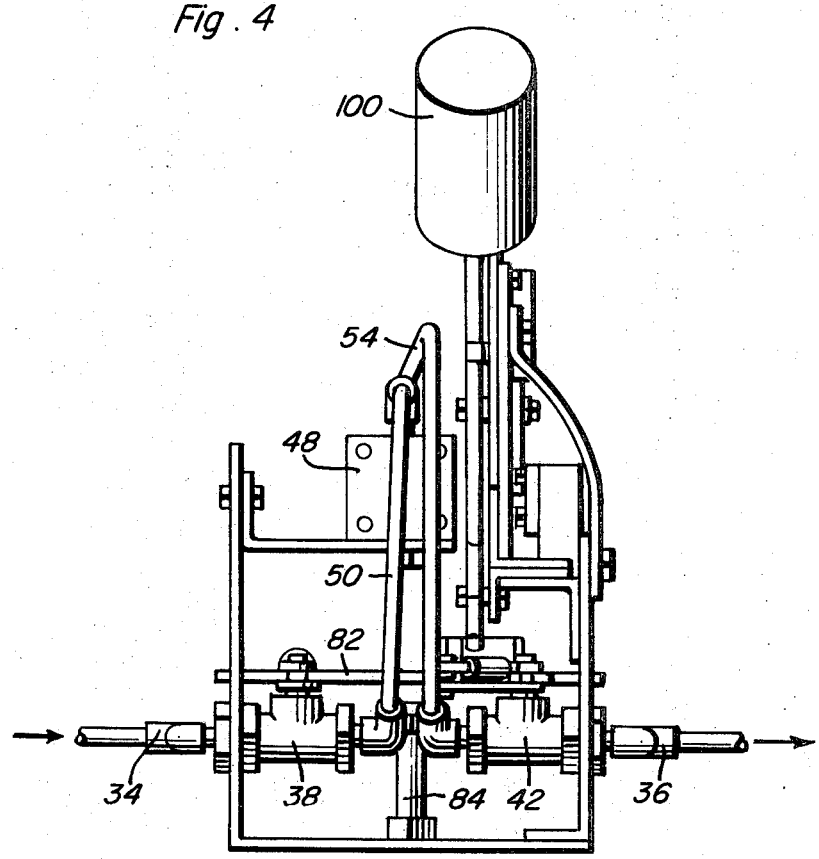

3,791,212

FLUID METERING APPARATUS

The present invention is generally related to fluid metering devices and, more particularly, to an improved fluid metering apparatus for accurately measuring the amount of fluid dispensed.

The apparatus of the present invention utilizes a metering cylinder of known dimensions with a piston slidably mounted therein for reciprocation through a stroke of known length, whereby the volume of fluid dispensed in each stroke may be accurately determined. By counting the number of strokes, the total volume of dispensed fluid may be accurately calculated. Preferably, the apparatus is provided with a mechanical counter or similar means for recording the number of piston strokes and being calibrated to provide a fluid volume reading.

The apparatus of the present invention is intended particularly for the measurement of fluid volume dispensed into petroleum products. Of course, the apparatus may be utilized in any industrial fluid dispensing system where the volume of fluid being dispensed must be accurately measured. In the past, several such fluid metering devices have been proposed. However, such conventional constructions possessed a disadvanage in that the reversing movements of the associated valves resulted in the exertion of back pressure on the piston due to the opening of the inlet valve at one end of the cylinder before the inlet valve at the opposite end had been fully closed. Furthermore, during the valve switching operation, the inlet and outlet valves were both opened for a short period of time which permitted direct fluid flow between the inlet and outlet sides of the system thereby significantly diminishing the accuracy of the devices. While more complex fluid metering constructions have been proposed to improve the measuring accuracy, they have been costly to manufacture and often incapable of withstanding heavy duty industrial operation required in most of such metering installations.

Therefore, it is an object of the present invention to provide an improved fluid metering apparatus which is relatively simple in construction, durable, long lasting, yet, provides accurate fluid measurement and is economical to manufacture.

Another object of the present invention is to provide a unique fluid metering apparatus including fluid-handling inlet and outlet valves coupled to a fluid dispensing piston in a manner to assure rapid switching of the valves at the end of each piston stroke, thereby isolating the inlet and outlet sides of the system to assure accurate fluid measurement.

It is a further object of the present invention to provide a versatile fluid metering apparatus including a snap-action, over-center mechanism interconnecting a fluid piston with a plurality of rotatable shaft on-off valves, whereby rapid switching of the valves may be achieved to provide improved measurement accuracy.

Still another object of the present invention is to provide an improved fluid metering apparatus including adjustable coupling members between the fluid handling valves and the operating mechanism, whereby movement of the valves may be accurately synchronized, thereby assuring adequate isolation between the inlet and outlet sides of the fluid metering system.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a diagrammatic illustration of the fluid metering system associated with the present invention.

FIG. 4 is an end view of the fluid metering apparatus shown in FIG. 2.

Figure 2:
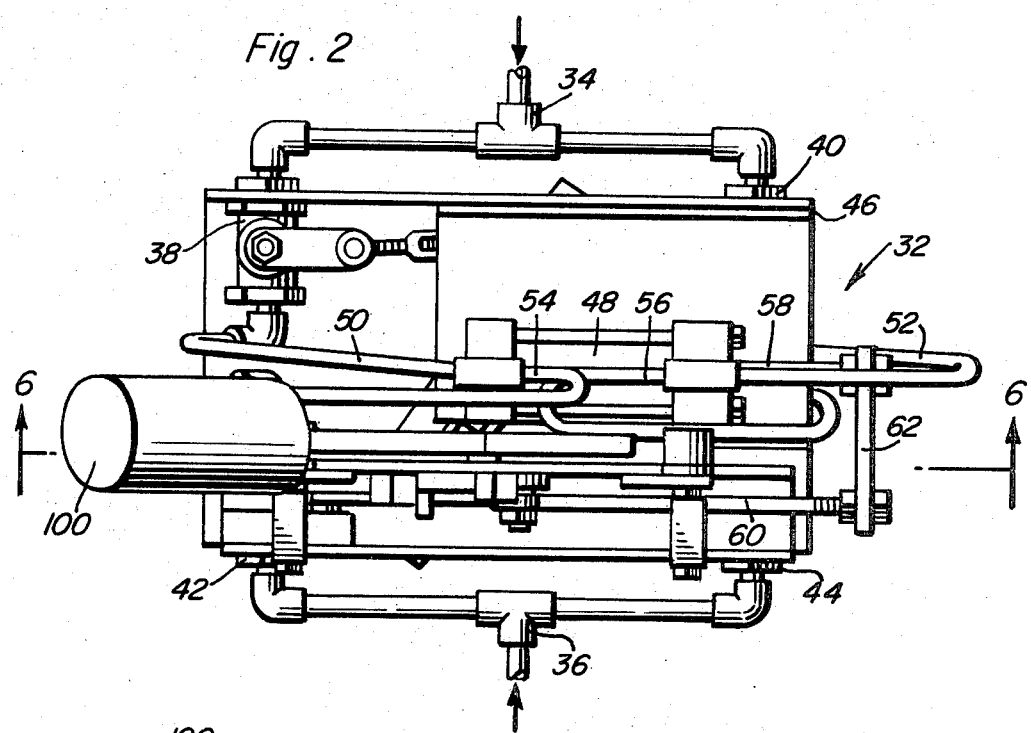
FIG. 2 is a plan view of the fluid metering apparatus of the present invention.

Referring now, more particularly, to FIG. 1 of the drawings, the fluid system associated with the metering apparatus of the present invention is generally indicated by the numeral 10 and includes an inlet 12 adapted to receive fluid under pressure from a source, not illustrated. Flow of the fluid is handled by a pair of on-off inlet valves 14 and 16 communicating with the opposite ends of a cylinder 18 through ports indicated at 20 and 22. A piston 24 is reciprocally mounted in cylinder 18 for movement under the influence of the fluid pressure. While the fluid pressure is effective to fill one side of the cylinder, fluid is displaced from the opposite side of the cylinder to an outlet 26 by way of one of a pair of on-off outlet valves 28 or 30. The piston is operatively connected to a counter 31, or similar means for recording the number of piston strokes. The inlet and outlet valves are also connected to the piston for simultaneous operation upon completion of each stroke. By properly synchronizing the switching of the valves, with the piston movement, all of the fluid passing through the metering apparatus must pass through the dispensing cylinder, thereby providing accurate volume measurement.

Figure 3:
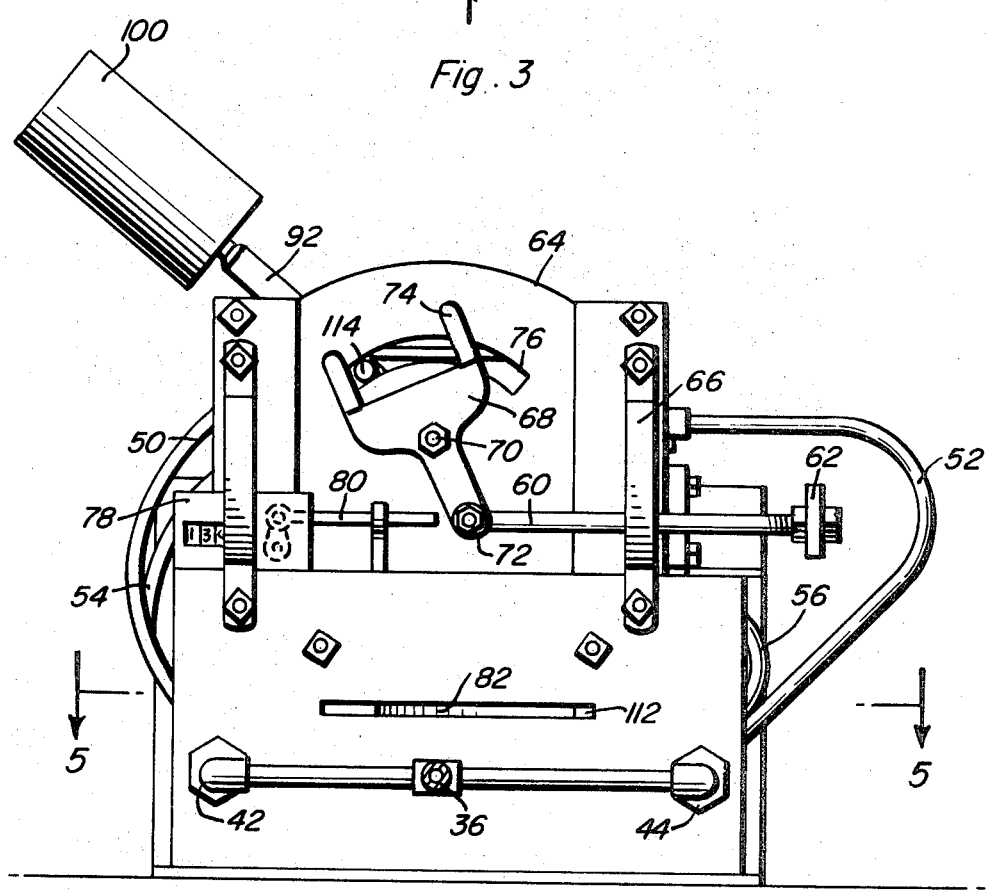
FIG. 3 is a side elevation of the fluid metering apparatus shown in FIG. 2.

Referring to FIGS. 2–4, the fluid metering apparatus of the present invention is generally indicated by the numeral 32 and includes fluid inlet and outlet fittings 34 and 36 in fluid communication with a pair of on-off inlet valves 38 and 40 and a pair of on-off outlet valves 42 and 44, respectively. Each of the valves is mounted to a housing or framework 46 and is in fluid communication with a metering cylinder 48 by way of tubing 50 and 52 or similar fluid handling means connected to ports at the opposite ends of the cylinder. Similarly, the outlet valves are in fluid communication with opposite ends of cylinder 48 by way of tubing members 54 and 56.

A piston, not illustrated, is reciprocally mounted in cylinder 48 in a conventional manner and is connected to a piston rod 58 extending to the exterior of the cylinder and coupled to an actuation rod 60 by way of a linkage member 62.

The housing is provided with a travel limit plate 64 which is vertically disposed and maintained in position by support straps 66 or similar means. A rocker member 68 is rotatably mounted to the limit plate at 70 with its lower end 72 pivotally connected to actuation rod 60. The upper end of the rocker member is provided with an opened fork portion defined by a pair of upstanding fingers 74 ovelying an arcuate slot 76 formed in the limit plate. A mechanical counter 78 is fastened to the housing and is provided with an actuation arm 80 reciprocally mounted in the path of travel of rocker member 68. Thus, each time the rocker member is reciprocated, such is recorded by the counter, preferably calibrated to provide a fluid volume reading.

Figure 5:
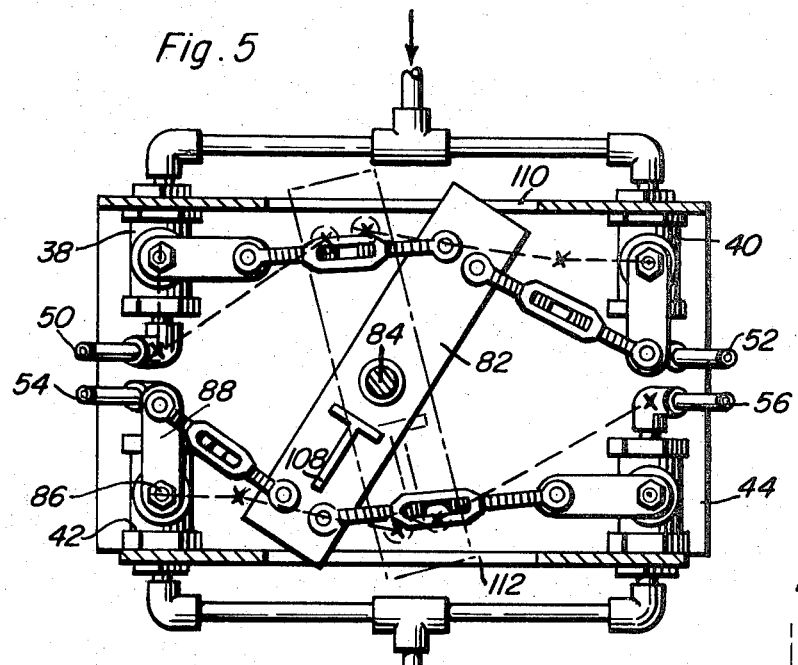
FIG. 5 is a sectional view taken along section 5—5 of FIG. 3.
Figure 6:
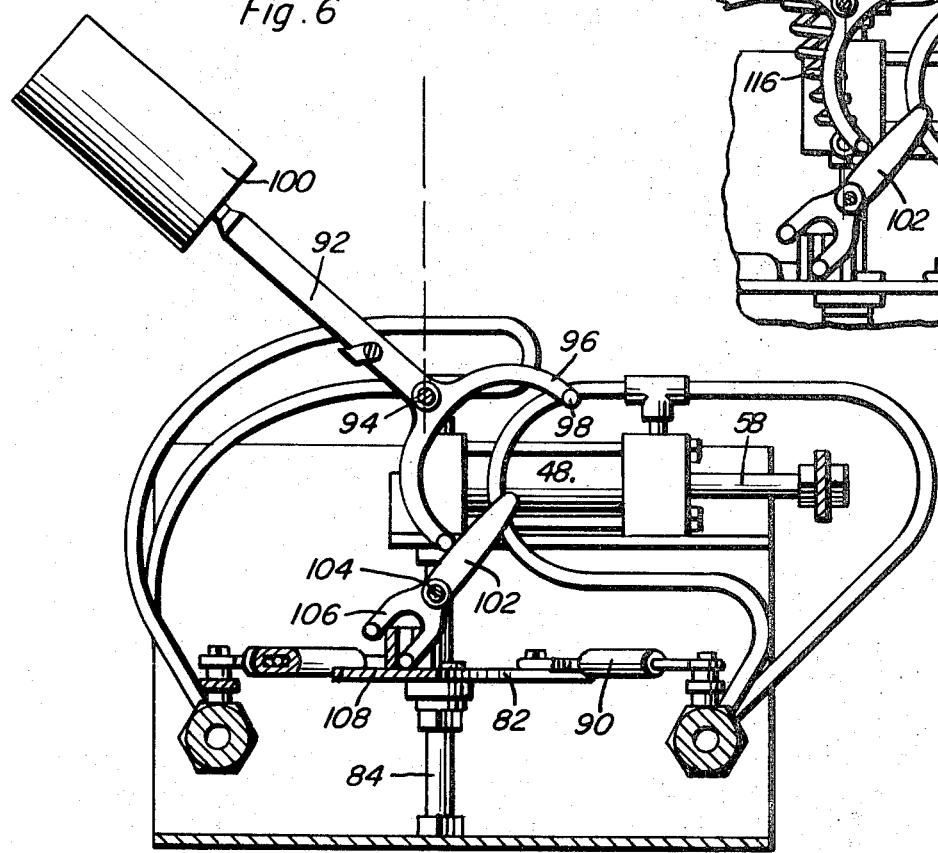
FIG. 6 is a sectional view taken along section 6—6 of FIG. 2.

Referring to FIGS. 4-6, operation of the inlet and outlet valves may be more fully appreciated. Each of the valves is actuated by a master trip lever 82 rotatably mounted to a vertical shaft 84 associated with the housing. Each valve is provided with a rotatable actuation shaft 86 with a lever member 88 affixed thereto such that they rotate in unison. Each lever member is connected to the master trip lever by way of a relatively rigid push-pull coupling, such as the adjustable turnbuckle indicated at 90. It will be appreciated that since each turnbuckle is adjustable in length, it is possible to accurately sychronize the switching of all four valves to assure isolation between the inlet and outlet sides of the fluid handling system. Movement of the lever members 88 associated with each valve through a 90 degree arc is effective to switch the valves between fully opened and fully closed modes. Preferably, the valves are of the ball and seat type intended for operation at pressures between 125 and 200 p.s.i.

Positive switching of the valves is provided by a snap action, over-center mechanism interconnecting the master trip lever with rocker member 68. This mechanism includes a second rocker member 92 pivotally mounted to the housing at 94 and including an opened fork portion 96 at its lower end with a pair of fingers 98 extending therefrom. The upper end of rocker member 92 is provided with a weight element 100 which is effective to flip the rocker member to the right or left once it has been influenced over the vertical centerline of the pivot point 94.

Fingers 98 associated with the fork portion of rocker member 92 are adapted to engage a rocker member 102 positioned in the path of travel of the fingers and also pivotally mounted to the housing as indicated at 104. The lower end of rocker arm 102 is provided with a bifuicated portion defined by a pair of downwardly directed legs 106 which straddle a vertical motion transfer plate 108 integral with the master trip lever. Thus, flipping of the over-center mechanism provides a snap action to the trip lever which effects simultaneous, rapid switching of the inlet and outlet valves. Unhindered movement of the master trip lever is enhanced by a pair of guide slots 110 and 112 formed in the opposite walls of the housing and slidably receiving the opposite ends of the master trip lever, to stabilize such during movement.

Movement of the over-center mechanism is initiated by way of a pin or shaft 114 attached to rocker member 92 and extending through arcuate slot 76 formed in the travel limit plate 64. Shaft 114 is positioned within the path of travel of fingers 74 associated with rocker member 68, and which are effective to influence weighted rocker member 92 to an over-center position.

Operation of the fluid metering apparatus of the present invention may be summarized as follows. Assuming that the over-center mechanism and valves are positioned as illustrated in the drawings, fluid enters the apparatus under pressure through fitting 34 and inlet valve 40 which is fully opened. Fluid is prevented from passing through inlet valve 38 since such is fully closed when inlet valve 40 is opened. Fluid enters cylinder 48 through tubing 52 and is effective to move the piston and associated piston rod 58 to the left. This movement is transmitted to actuation rod 60 and is effective to rotate rocker member 68 in a clockwise direction and influence weighted rocker member 92 to an over-center position by way of pin 114. Upon movement over the vertical centerline of pivot point 94, the weighted rocker member 92 flips to the right striking rocker arm 102 which, in turn, flips the master trip lever in a counterclockwise direction to the position indicated in dash in FIG. 5. This operation simultaneously trips the inlet and outlet valves, reversing their mode such that fluid enters through valve 38 and exits through valve 44, thereby reversing the direction of piston travel to repeat the cycle of operation.

It will be appreciated that the adjustable turnbuckles 90 provide positive action between the master trip lever and the valves and at the same time permit accurate adjustment to assure simultaneous valve operation. Any one of several convenient valve constructions may be utilized. While the internal structure of the valves is not illustrated, it is preferred that such valve a lost motion type operation such that closure of the valve is provided before the associated actuation shaft has completed its 90 degree rotation. Such an arrangement provides short momentary closure of all four valves during the switching operation, thereby assuring isolation between the inlet and outlet sides of the system. It should also be noted, that the length of the arcuate slot 76 is such that pin 114 will be prevented from striking the lower finger of rocker portion 74, thereby eliminating any momentary backpressure on the piston.

Figure 7:
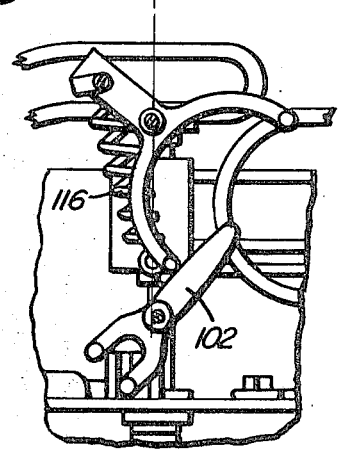
FIG. 7 is a partial side elevation of a modified form of the over-center mechanism associated with the present invention.

From the foregoing description it will be appreciated that the dispensing cylinder associated with the apparatus of the present invention may be replaced with a cylinder of different bore size to provide the desired fluid volume discharge per stroke. Even slight changes in the piston stroke may be made without adversely affecting the valve operation. The over-center mechanism may be provided with a coil compression spring such as that indicated at 116 in FIG. 7, rather than weight element 100. Such an arrangement provides a similar snap action, but requires substantially less space permitting a more compact installation. Of course, minor changes in the exact configuration or location of the rocker members or master trip lever are deemed to fall within the scope of the present invention.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A fluid metering apparatus comprising a housing, a fluid dispensing cylinder mounted to said housing and having a first port communicating with one end and a second port communicating with the opposite end, a piston movably disposed in said cylinder for reciprocation therein, first and second inlet valves in fluid communication with said first and second ports respectively and having opened and closed modes, first and second outlet valves in fluid communication with said first and second ports resepctively and having opened and closed modes, and actuation means operatively connected to said piston for simultaneously switching the modes of said inlet and outlet valves when said piston completes a stroke, said first inlet valve and said second outlet valve being in one mode when said second inlet valve and said first outlet valve are in the other mode, said actuation means including: a master trip lever rotatably mounted to said housing and movable between first and second angular positions corresponding to the opposite ends of the piston stroke, coupling means operatively connecting said inlet and outlet valves with said trip lever, a piston rod connected to said piston and extending to the exterior of said cylinder, an actuation rod connected to said piston for movement therewith, a rocker arm pivotally mounted to said housing and having a first end operatively connected to said trip lever to impart rotation thereto and an over-center means connecting said actuation rod with said rocker arm to snap said master trip lever and rapidly switch said valves between said modes.

2. The apparatus set forth in claim 1 wherin said inlet and outlet valves each includes a rotatable actuation shaft with a lever member affixed thereto and connected to said coupling means.

3. The apparatus set forth in claim 2 wherein each of said valve actuation shafts rotates about an axis substantially parallel to the rotational axis of said master trip lever.

4. The apparatus set forth in claim 3 wherein said coupling means includes adjustable turnbuckles connecting said valve lever members to said master trip lever.

5. The apparatus set forth in claim 1 wherein said over-center means includes a first rocker member pivotally mounted to said housing with a first end pivotally connected to said actuation rod and an opposite end having an opened fork portion, and a second rocker member rotatably mounted to said housing and including one end portion with a protuberance extending into the path of travel of the fork portion associated with said first rocker member and an opposite end with a second fork portion operatively engaging said rocker arm, said first and second fork portions defining a lost-motion connection.

6. The apparatus set forth in claim 5 wherein said rocker arm has one end operatively engaging said second fork portion and an opposite end with a third fork portion operatively engaging said master trip lever.

7. The apparatus set forth in claim 5 wherein said housing includes a vertical travel limit plate with an arcuate slot therein of predetermined length, said first rocker member being on one side of said slot and said second rocker member being on the opposite side of said slot, said protuberance extending through said slot for engagement with the fork portion of said first rocker member.

8. The apparatus set forth in claim 7 wherein said first fork portion associated with said first rocker member comprises a pair of fingers paced apart from each other by a distance greater than one half of said predetermined arcuate slot length.

* * * * *